United States Patent [19]
Plant et al.

[11] Patent Number: 5,228,397
[45] Date of Patent: * Jul. 20, 1993

[54] APPARATUS FOR PRODUCING A VEGETABLE PRODUCT

[75] Inventors: Rex B. Plant; John P. Marton, both of Hamilton, Canada

[73] Assignee: 461844 Ontario Limited, Hamilton, Canada

[*] Notice: The portion of the term of this patent subsequent to Oct. 29, 2008 has been disclaimed.

[21] Appl. No.: 762,444

[22] Filed: Sep. 19, 1991

Related U.S. Application Data

[62] Division of Ser. No. 354,940, May 22, 1989, Pat. No. 5,060,563.

[51] Int. Cl.⁵ .................. A23L 1/216; A23N 15/00; A23P 1/00; B26D 3/26
[52] U.S. Cl. .................................. 99/544; 99/589; 99/590; 99/593
[58] Field of Search .................. 99/537, 538, 544, 545, 99/547, 564, 584, 589, 514, 542, 543, 552, 555, 557, 593, 590, 565; 83/404, 425.2, 409.2, 865; 408/37

[56] References Cited

U.S. PATENT DOCUMENTS

| | | | |
|---|---|---|---|
| 1,284,132 | 11/1918 | Nikolow | 99/544 |
| 2,130,949 | 9/1938 | Collens | 99/564 |
| 2,908,305 | 10/1959 | Wilms et al. | 99/565 |
| 3,057,386 | 10/1962 | Massaro | 99/538 |
| 3,504,720 | 4/1970 | Mason | 99/584 |
| 3,780,435 | 12/1973 | Farha et al. | 99/564 |
| 3,933,085 | 1/1976 | Rejsa | 83/409.2 |
| 4,108,565 | 8/1978 | Janssen | 408/37 |
| 4,352,325 | 10/1982 | Pleus | 99/545 |
| 5,060,563 | 10/1991 | Plant et al. | 99/544 |

Primary Examiner—Timothy F. Simone

[57] ABSTRACT

An apparatus for producing a product of predetermined shape from a vegetable which the vegetable is centered above a tube, the tube having an annular cutting edge. The vegetable is pressed into the tube to form a cylindrical core. The core is rotated about the longitudinal axis of the tube and then a cutting tube moveable laterally against the core cuts the predetermined shape from the core when the core is rotated.

16 Claims, 9 Drawing Sheets

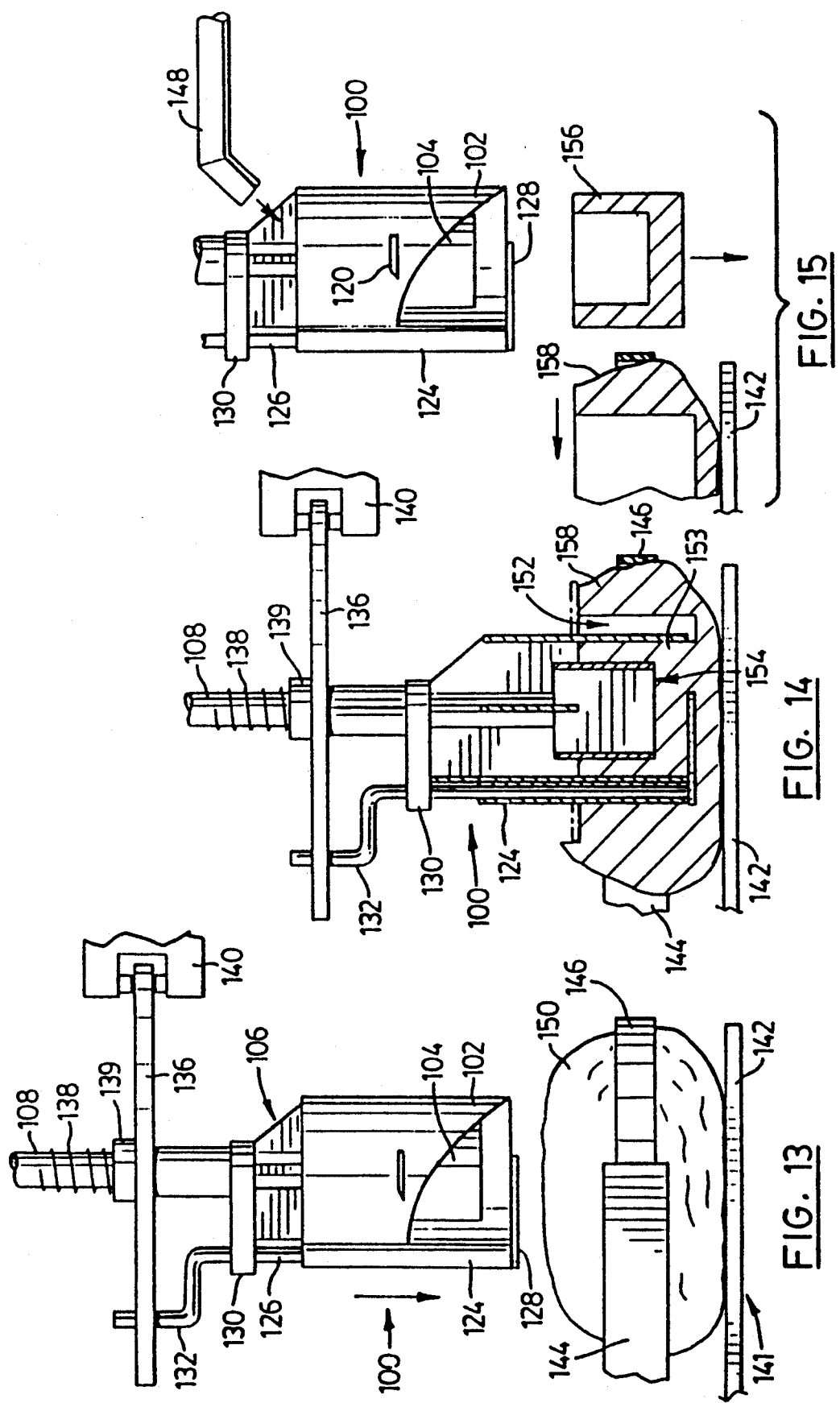

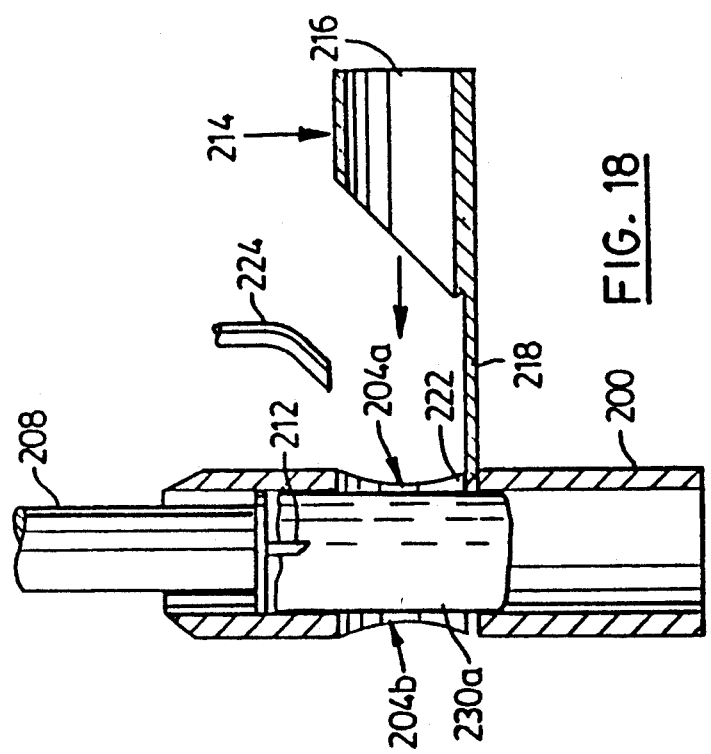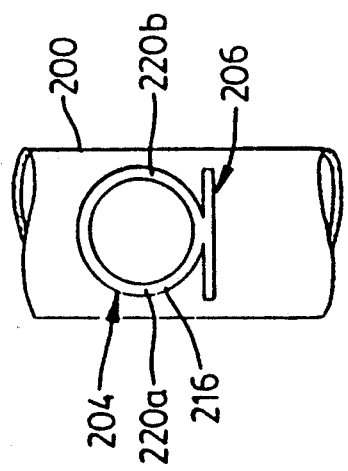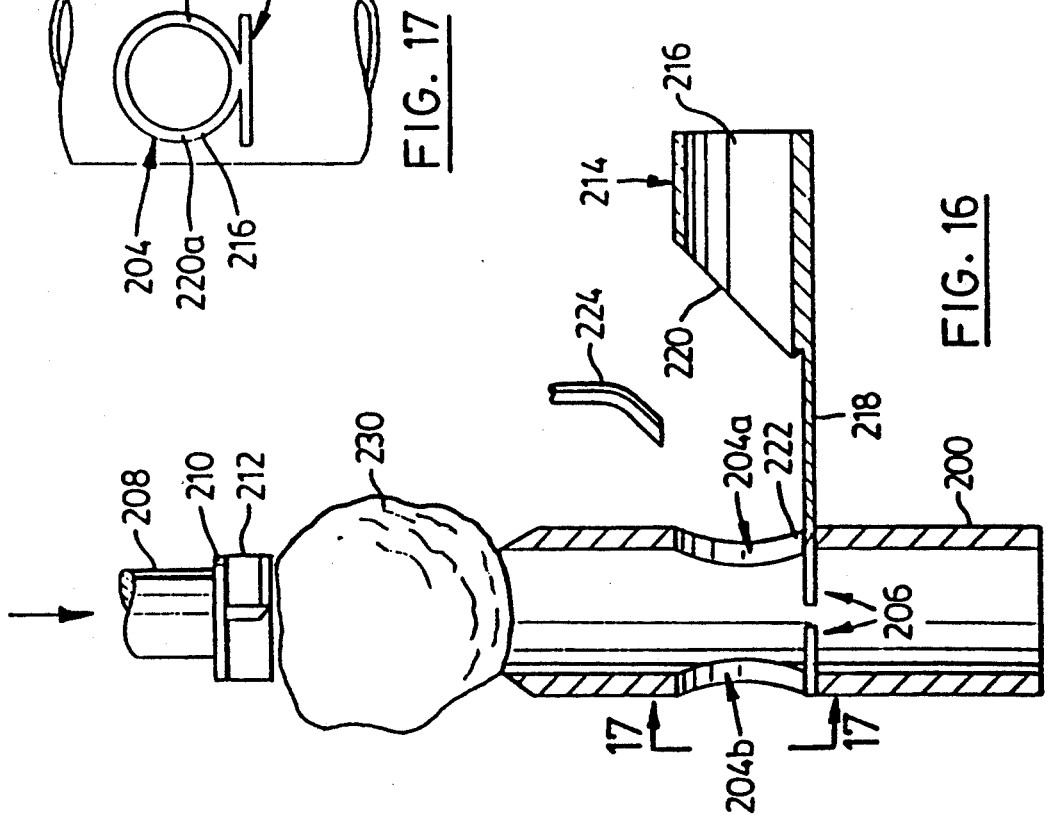

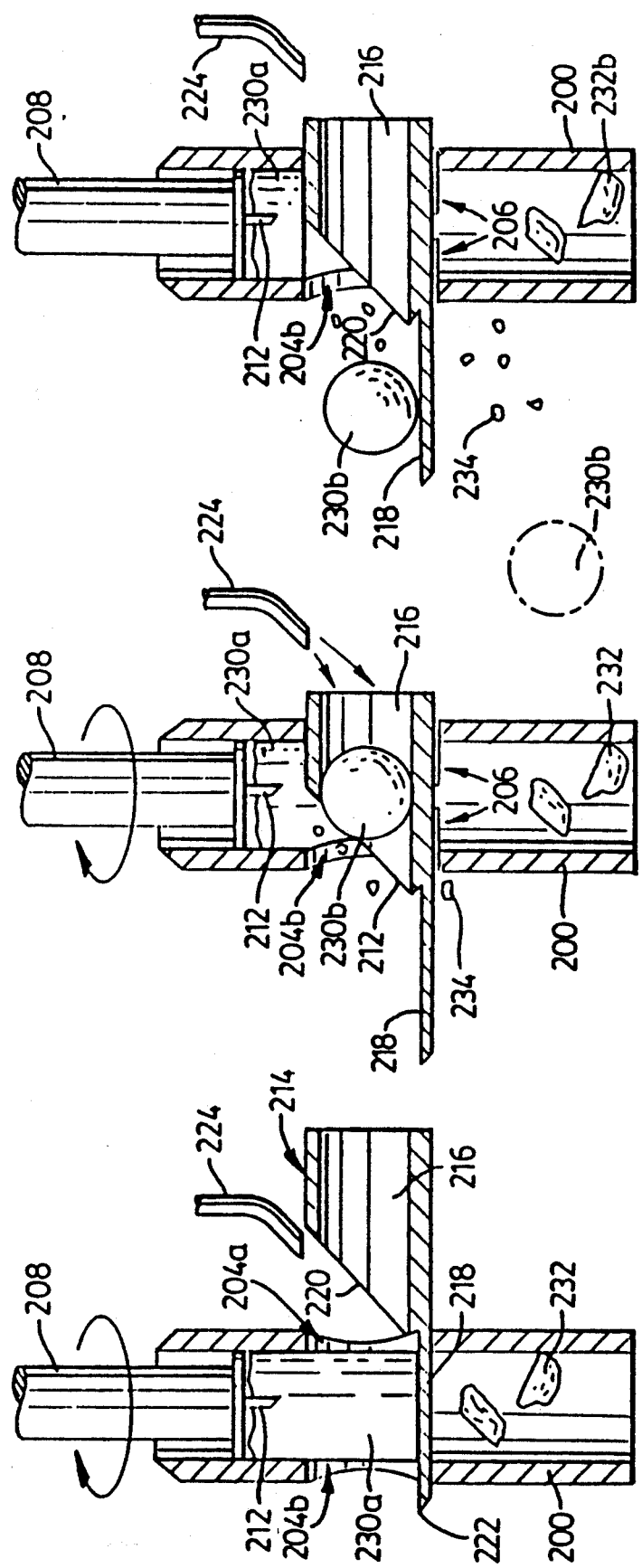

1

APPARATUS FOR PRODUCING A VEGETABLE PRODUCT

This is a division of application Ser. No. 354,940, filed May 22, 1989, U.S. Pat. No. 5,060,563.

FIELD OF INVENTION

This invention relates to a method and an apparatus for mechanically cutting food produce into shaped configurations.

BACKGROUND OF THE INVENTION

It has long been known to cut, by hand, vegetables and the like int various shaped configurations for decorative purposes. It has also been long known to use a mechanical apparatus to cut vegetables into various simple, generally longitudinal shapes. For example, a CUISINART (a trade-mark) can be used to cut food produce into strips or juliennes and the like.

However, such known methods and apparatus cannot be applied on an industrial level where a high volume of produce is to be cut into complex, generally non-longitudinal shapes.

It is therefore an object of the present invention to provide an improved method and an apparatus for automatically cutting produce into shaped configurations.

STATEMENT OF THE INVENTION

In accordance the present invention, there is provided, an apparatus for producing a product of predetermined shape from a vegetable, comprising, means to center the vegetable above a tube having a first end, said first end forming an annular cutting edge, means to press the vegetable into the tube to form a cylindrical core having a longitudinal axis, means to rotate the core about the longitudinal axis, and cutting means moveable into the tube for cutting the core and when the core is rotated, whereby the predetermined shape is cut from the core.

BRIEF DESCRIPTION OF THE DRAWINGS

Example embodiments of the invention are shown in the accompanying drawings, in which:

FIG. 13 is a side view of the cutting apparatus shown in FIG. 10, positioned to cut a potato;

FIG. 14 is a side view similar to FIG. 13, in partial section, of the apparatus cut into the potato;

FIG. 15 is a view again similar to FIG. 13, showing cut portions of the potato in cross-section;

FIG. 16 is a elevational view, partly in cross-section, of a third embodiment of the cutting apparatus of the invention;

FIG. 17 is a view taken in the direction of line 17—17 of FIG. 16; and

FIGS. 18 to 21 inclusive are views similar to FIG. 16 showing successive stages in the operation of producing a parisienne shaped product from a potato.

DESCRIPTION OF PREFERRED EMBODIMENT

Figure 1:
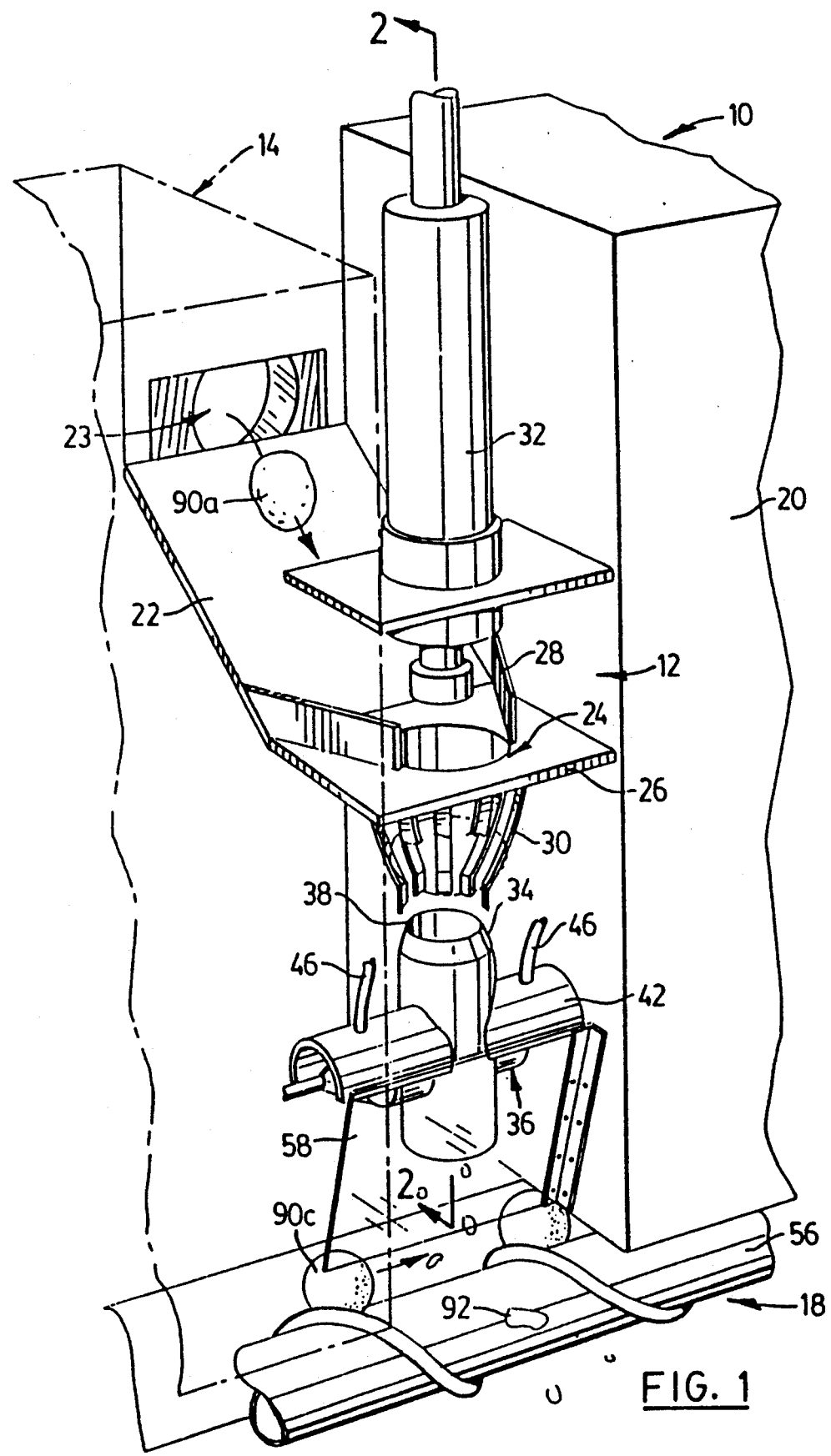
FIG. 1 is a perspective view, in partial cross-section, of a first embodiment of a produce cutting apparatus of the invention showing parisienne shaped products being cut from a potato.

The first embodiment shown in FIGS. 1 to 9 of the drawings generally consists of a cutting apparatus 10 comprising a feeding station 12 fed from a hopper assembly 14, and a cutting station 16 leading to a collecting station 18. Feeding station 12 and cutting station 16 are mounted between a spaced pair of supports 20.

Feeding station 12 comprises a downwardly inclined feeding ramp 22 leading from an inlet aperture 23 to a central aperture 24 in a platform 26 having guide baffles 28 adjacent the central aperture. A spring basket 30 is positioned below central aperture 24 and a reciprocal plunger 32, slidable in a guide 33 and actuated by a pneumatic or hydraulic cylinder (not shown), is positioned above the central aperture in axial alignment with the central aperture and the basket.

Cutting station 16 is positioned centrally below feeding station 12 and comprises a vertical cutting tube 34 and a pair of opposed, horizontally disposed cutting elements 36 impinging at right angles on the tube. Tube 34 is axially aligned with spring basket 30 and plunger 32 and has an upper cutting edge 38. Cutting elements 36 are each disposed beneath a shield 42, and axially aligned with an aperture 44 in tube 34. A fluid conduit outlet 46 projects through each shield 42.

Figure 3:
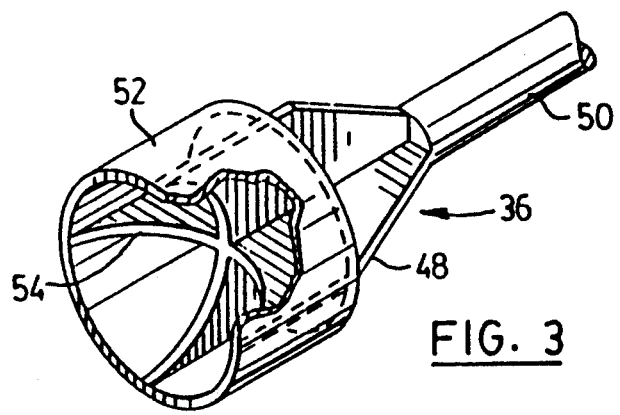
FIGS. 3, is a perspective view, in partial cross-section, of a rotatable cutting blade of the apparatus of FIG. 1 for cutting a parisienne potato.
Figure 4:
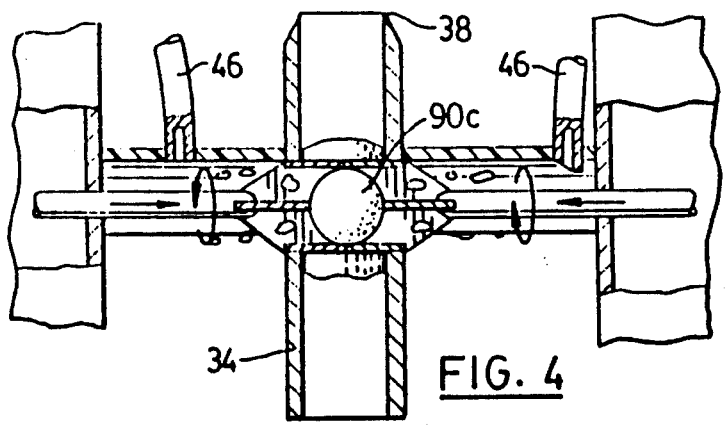
FIG. 4 is a side view, in partial cross-section, showing a pair of the rotatable cutting blades in FIG. 3 in operation in the apparatus of FIG. 1.
Figure 5:
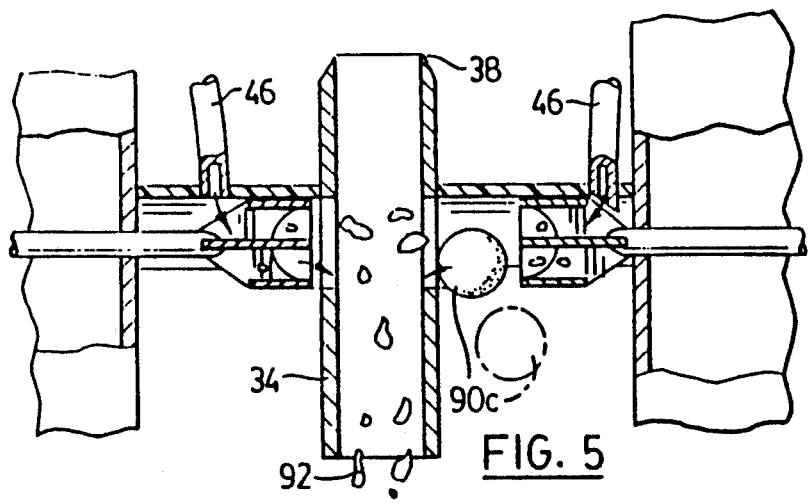
FIG. 5 is a view similar to FIG. 4 showing the discharge of a parisienne.
Figure 6:
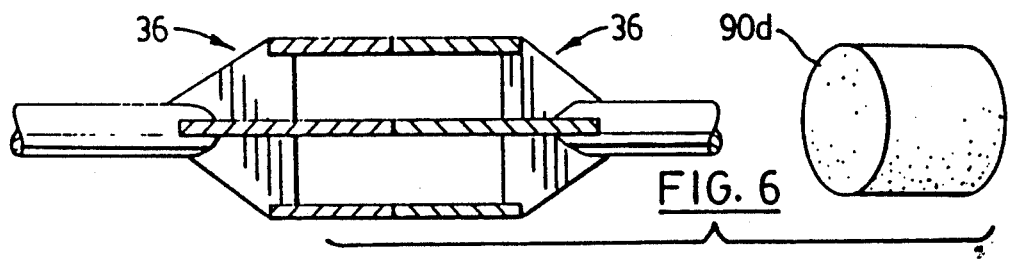
FIG. 6 is a side view, in partial cross-section of a pair of rotatable cutting blades of the apparatus of FIG. 1, adapted to cut cylindrical-shaped vegetable products together with a perspective view of the product.
Figure 7:
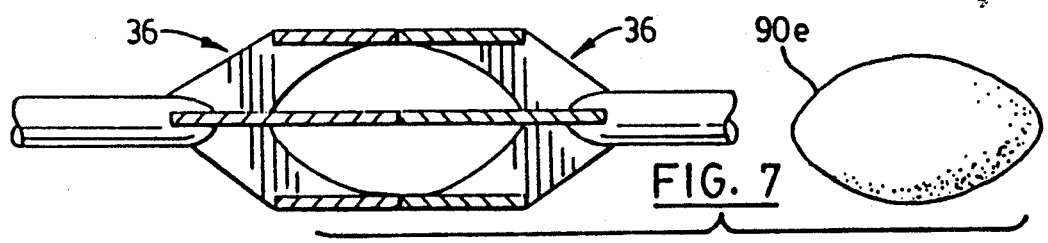
FIG. 7 is a view similar to FIG. 6 showing, in partial cross-section, a pair of rotatable cutting blades adapted to cut oblate-shaped vegetable products, together with a perspective view of the product.
Figure 8:
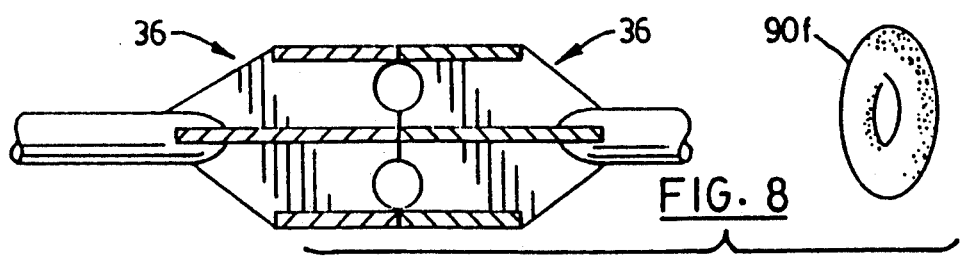
FIG. 8 is another view similar to FIG. 6 showing, in partial section, a pair of rotatable cutting blades adapted to cut torus-shaped vegetable products, together with a perspective view of the product.

Cutting blade assembly 36, seen more particularly in FIG. 3, consists of a cruciform array of knives 48 mounted on the end of a shaft 50 and circumscribed by a cylindrical sleeve 52 fixed to the knives. The cutting edges 54 of knives 48 are curved inwardly to form a hemispherical recess at one end of sleeve 52.

Collecting station 18, located below tube 34, comprises a horizontal helical feeder shaft 56. A sloping deflector plate 58 is positioned between the bottom of tube 34 and feeder shaft 56.

Figure 9:
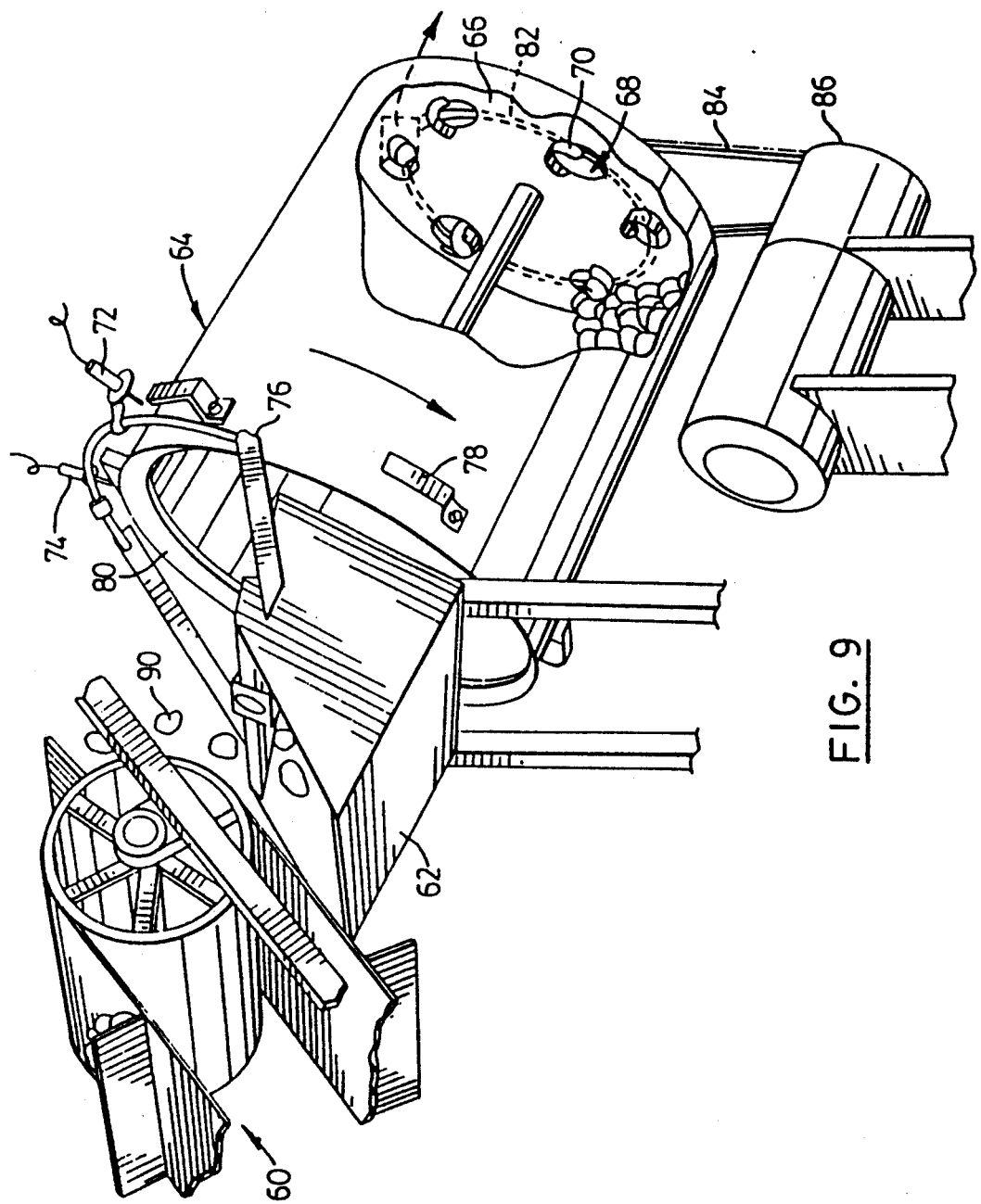
FIG. 9 is a perspective view of a rotating feeder drum for feeding produce to the cutting station of FIG. 1.

Hopper assembly 14, shown in FIG. 9, comprises an endless conveyer 60, an inlet trough 62 and an inclined, rotatable loading drum 64. The lower, outlet end 66 of drum 64 has a ring of apertures 68 with a loading scoop 70 mounted on the inner face of the lower end of the drum adjacent each aperture. Magnetic proximity sensors 72 and 74 are mounted on a frame 76 on inlet trough 62 to correlate with a circumferential row of magnetic flanges 78 mounted on drum 64 adjacent inlet end 80 of the drum. A fixed circular restraining bar 82 is located adjacent drum 64 to bar egress of potatoes in all apertures 68 except the uppermost aperture which registers with inlet aperture 23 of feeding station 12. Drum 64 is driven by a belt 84 from a motor 86.

In the operation of the embodiment shown in FIGS. 1 to 9 potatoes 90 are transported along conveyer 60 and fed into trough 62 to tumble downwardly into inclined rotatable drum 64. As drum 64 rotates, each scoop 70 carries an individual potato 90a upwardly until that aperture 68 associated with the scoop registers with inlet 23 whereupon the potato falls onto feeder ramp 22 and, guided by guard rails 28, through aperture 24 in platform 26 and into spring basket 30.

When potato 90a is positioned within spring basket 30, plunger 32 is activated and travels downwardly, pushing the potato onto cutting edge 38 of the vertical tube 34. As plunger 32 continues to move downwardly, a central cylindrical potato core 90b is produced by cutting edge 38 and the core is pressed downwardly in tube 34 by the plunger until the core is in horizontal alignment with apertures 44 and cutting elements 36. Peripheral potato scraps 92, which are cut away to form core 90b, fall into a scrap bin (not shown).

When cylindrical core 90b comes into horizontal alignment with cutting elements 36 the cutting elements are activated to approach the cylindrical core from opposite directions, as seen in FIG. 3 of the drawings, at the same time rotating axially to cut a spherical product 90c. Depending upon the configuration of the recess formed by the cutting edges 54 of knives 48, differently shaped products 90c may be formed, for example with reference to FIGS. 6, 7 and 8, of the drawings, cutting elements 36 are shown which produce a cylindrical product 90d, an oblate product 90e and a toroidal product 90f respectively.

Figure 2:
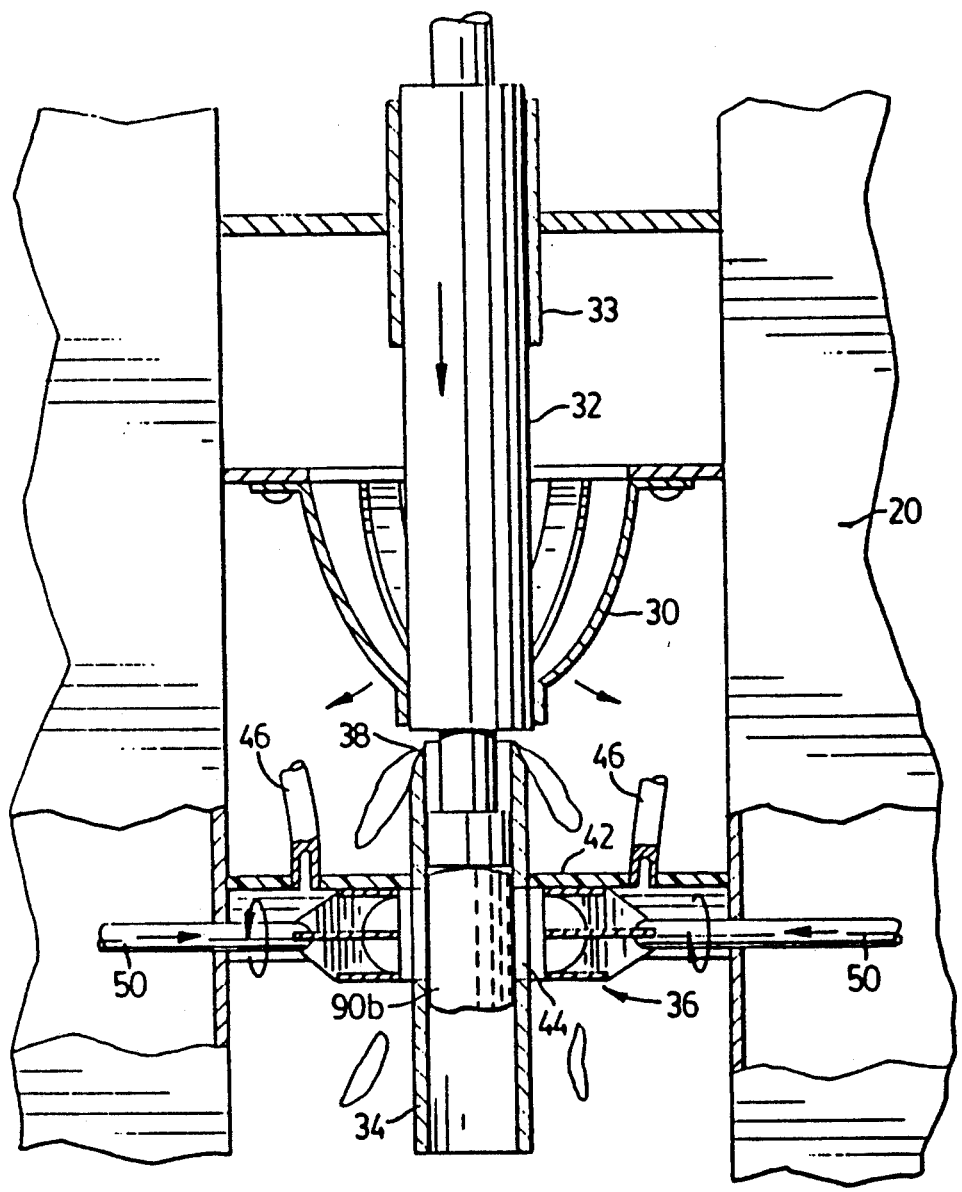
FIG. 2 is a side view, in partial cross-section, of the apparatus shown in FIG. 1.

Once the shaped product is cut, cutting elements 36 are retracted to their original positions, as seen in FIG. 2 of the drawings, and water jets from conduits 46 eject product 90c from tube 34 and/or from either of cutting elements 36. The action of the water jets also flushes superfluous debris 92 from tube 34.

The rotation of drum 64 controls the timed sequence of events. When the drum moves to a position where a potato 90a passes from aperture 68 to inlet aperture 23 of feeding station 12, proximity sensor 74 is activated by magnetic flange 78 and signals the actuation of plunger 32 to push the potato into tube 34. Plunger 32 operates cyclically and when it reaches the downward end of its travel in tube 34, i.e. when potato core 90b is in alignment with cutting elements 36, it signals the cutting elements to operate and then retracts upwardly to its original position of rest. On the continued rotation of drum 64 magnetic flange 78 activates proximity sensor 72 to signal the passage of water through conduits 46, the length of flange 78 determining the length of time the fluid jets operate.

Figure 10:
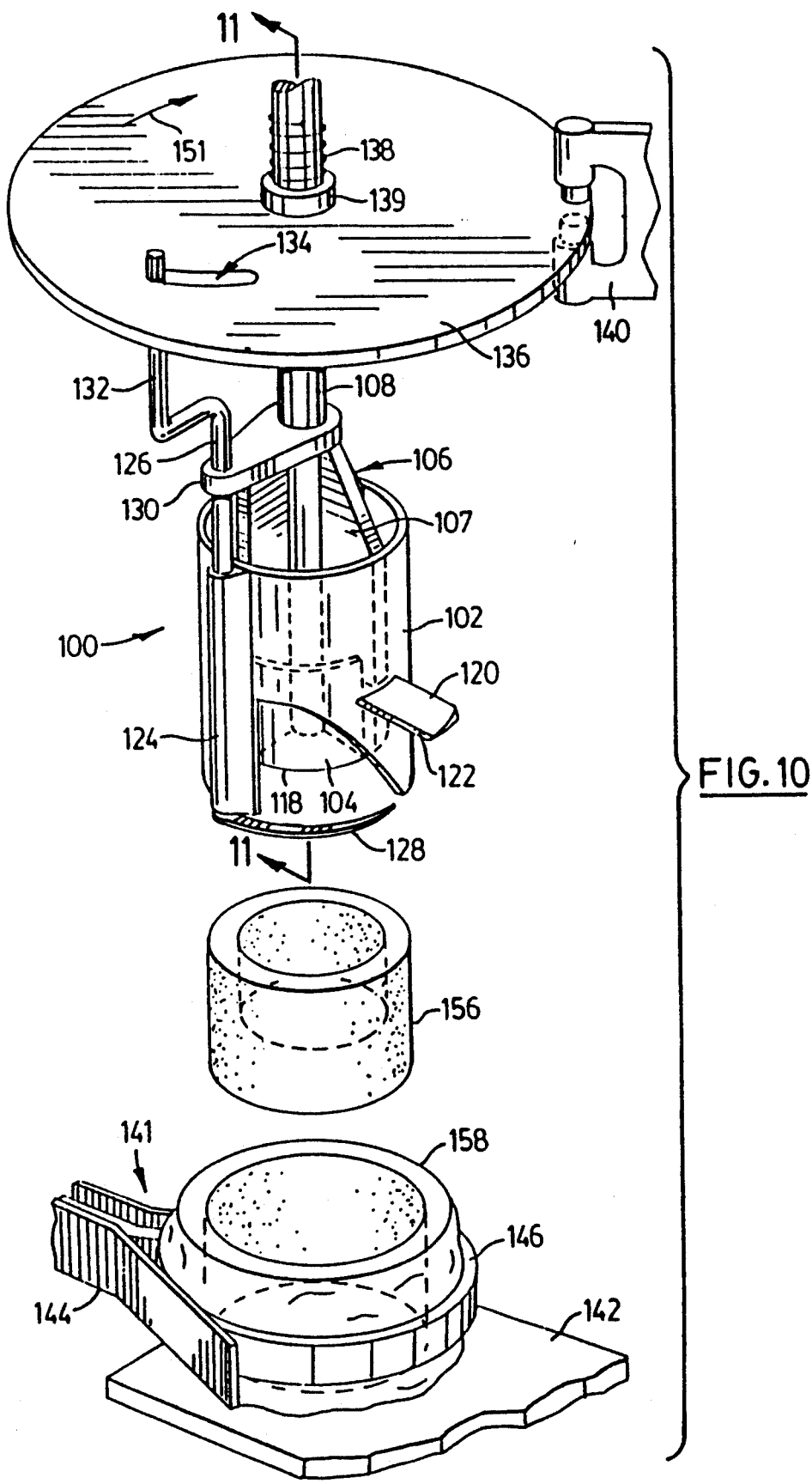
FIG. 10 is a perspective view, in partial cross-section, of a second embodiment of the cutting apparatus of the invention.
Figure 11:
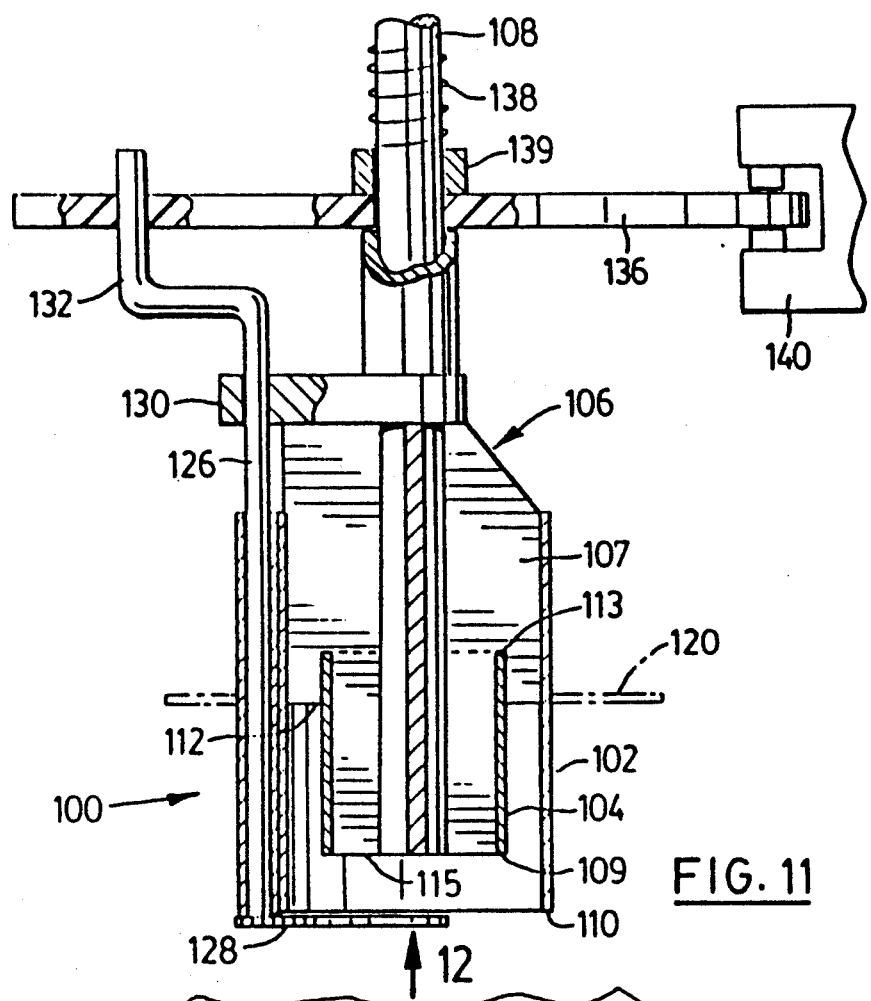
FIG. 11 is a side view of the cutting apparatus shown in FIG. 10.
Figure 12:
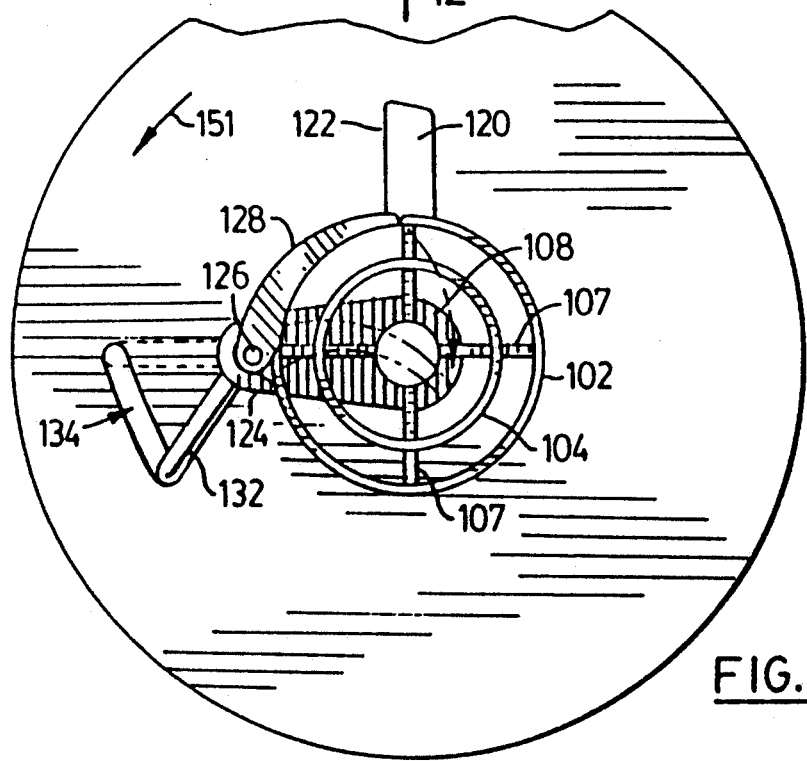
FIG. 12 is a bottom plan view of the cutting apparatus of FIG. 10, taken in the direction of arrow 12.

The second embodiment shown in FIG. 10 to 15 of the drawings consists of a cutting apparatus 100 comprising an outer cylindrical cutting tube 102 and a concentric inner cylindrical cutting tube 104 both fixed on a cruciform brace 106 having flanges 107 extending radially from a rotatable drive shaft 108. As seen in FIG. 11: (1) the lower rim 109 of inner cutting tube 104 lies above the lower rim 110 of outer cutting tube 102, i.e. the inner tube terminates within the outer tube; (2) the lower ends 112 of flanges 107 of brace 106 located between inner cutting tube 104 and outer cutting tube 102 lie below the upper rim 113 of inner cutting tube 104 and above the lower rim 110 of outer cutting tube 102; and (3) the lower ends 115 of flanges 107 of brace 106 located within inner cutting tube 104 terminate at lower rim 109 of inner cutting tube 104. A fin 120 extends laterally from outer cutting element 102 with a leading cutting edge 122 lying in the same plane as the lower ends 112 of flanges 107 of brace 106.

Outer cutting tube 102 carries a sleeve 124 holding a vertical shaft 126 rotatable in the sleeve. An arcuate cutting spur 128 is fixed to the lower end of shaft 126 with its cutting edge following the curve of outer cutting element 102. The upper portion of shaft 126 passes through a flange 130 fixed on shaft 108 and the shaft is angled above the flange to form a crank arm 132. The upper end of crank arm 132 engages an arcuate slot 134 in a disc 136 which is mounted concentrically on drive shaft 108 and is freely rotatable on the drive shaft. A torsion spring 138 is attached at one end to a bushing 139 on disc 136 and at the other end to shaft 108. A disc brake 140 brackets the periphery of disc 136. A nozzle 148 (FIG. 15) of an air or water conduit (not shown) is located above cutting tube 102 and 104.

A laterally movable holding unit 141 is positioned below cutting apparatus 100 and consists of a platform 142 and a V-shaped bracket 144 located above the platform and offset from the axis of drive shaft 108. A loop 146 of resilient material extends laterally from bracket 144 with the centre of the loop lying in the axis of drive shaft 108.

The operation of the embodiment of FIGS. 10 to 15 is shown in FIGS. 13 to 15. A potato 150 is placed on platform 142 within loop 146 which is tightened to hold the potato against bracket 144, thereby positioning the potato directly below cutting apparatus 100 as seen in FIG. 13. Drive shaft 108 is then rotated at considerable speed, say 2500 rpm, in the direction of arrow 151 and cutting apparatus 100 is lowered onto potato 150. As cutting apparatus 100 moves downwardly, spur 128 and the lower end 110 of outer cutting tube 102 bite into potato 150, cutting an annular cavity 152 in the potato to form a cylindrical plug 153, and at the same time cutting tube 102 and lower ends 115 of flanges 107 cut a cylindrical pocket 154 in plug 153 concentric with cavity 152. In the same step wing 120 trims the upper part of outer portion 158 of the potato and lower ends 112 of flanges 107 trim the annular portion of the potato between cutting tubes 102 and 104, all as seen in FIG. 14. On reaching a predetermined depth, disc brake 140 is actuated, against the action of torsion spring 138, to slow the rotation of disc 136 which pushes crank arm 132 against the end of slot 134 as seen in FIG. 10 and 11 causing spur 128 to move inwardly across bottom 110 of outer cutting tube 102, as shown in broken lines in FIG. 12. Slot 134, curving inwardly, accommodates the radial component of movement of crank arm 132. The inward movement of spur 128 severs that portion of the potato within the outer cutting element, forming an inner cup 156 and an outer cup 158. On the completion of these steps cutting apparatus 100 is raised, carrying cup 156 which rests on spur 128. Platform 142 is then moved laterally, with bracket 144, to dispose of outer cup 158 of potato 150 for collection by suitable means not shown. Disc brake 140 is then disengaged, allowing spring 138 to move spur 128 back to its position of rest and allowing inner cup 156 to be forced out of cutting tubes 102 and 104 by a jet of fluid (air and water in the form of a spray) from nozzle 148, to drop onto a suitable collecting mechanism not shown. If desired, a transverse nick in the lower ends of 109 and 110 of cutting tubes 104 and 102 creates a burr which facilitates the separation of cup 156 from apparatus 100. It will be appreciated that the walls of cutting elements 102 and 104 are thin and do not require bevelled edges to cut through a vegetable product.

The third embodiment shown in FIGS. 16 to 21 of the drawings consists of a stationary vertical cutting tube 200 having an upper cutting edge 202 and a pair of opposed circular aperture 204 with a horizontal slot 206 tangential to each aperture. A rotatable vertical plunger 208 is axially aligned with tube 200 and positioned above the tube. Fixed to the lower end of plunger 208 is a head 210 having a pair of mutually perpendicular depending flanges forming a cruciform knife 212 laterally dimensioned to pass into tube 200. A tubular, horizontal cutting head 214 is associated with tube 200, and comprises a horizontal cutting tube 216 with an attached horizontal slide plate 218. One end of tube 216 is chamfered to provide a sloped advance edge 220 sloping downwardly towards tube 200 with one side 220a of the edge being sharp and the other side 220b being rounded. Slide plate 218 is attached tangentially to cutting tube 216 and projects forwardly towards tube 200 to terminate in a cutting edge 222, the width of the plate being slightly less than the width of slots 206 in tube 200. An air nozzle 224 is positioned adjacent cutting head 214 and aperture 204a.

In the operation of the device of FIGS. 16 to 21 a potato 230 is placed centrally on cutting edge 202 Of tube 200, as seen in FIG. 16, using feeding station 12 shown in FIGS. 1 and 2. Plunger 208 is lowered to have knife 212 bite into the top of the potato and continues to descend, as seen in FIG. 18, to have cutting edge 202 of tube 200 form a core 230a from potato 230 which is pushed down within tube 200 to register with apertures 204. In the next step, seen in FIG. 19, cutting head 214 is moved forward to have slide plate enter slots 206 and sever the bottom portion of potato 230 which drops through tube 200 as scrap 232. Plunger 208 is then caused to rotate and, as cutting head 214 continues to move forwardly, cutting tube 216 enters aperture 204a which causes cutting edge 220a to form a shaped product 230b from core 230a as the plug rotates, as seen in FIG. 20. As cutting head 214 moves forwardly a jet spray issues from nozzle 224 into tube 216 of the cutting head which has moved forwardly past the nozzle, which forces both debris 232 and shaped product 230b out of the tube through aperture 204b onto slide plate 218 and off the slide plate to be collected below the apparatus. In conjunction with the last step (FIG. 21) plunger 208 may be withdrawn from 200 (retracted) and any remaining potato scrap removed from knife 212.

It will be appreciated that products of shapes other than spherical (parisiennes) may be produced by the embodiment of FIGS. 16 to 21. Different shapes can be achieved by varying the shape of the cross-section of cutting tube 216. Also the cutting efficiency of cutting head 214 may be improved by varying the contour of cutting edge 220.

The term "vegetable" used herein includes a fruit.

We claim:

1. Apparatus for producing a product of predetermined shape form a vegetable, comprising:

means to center the vegetable above a tube having a first end, said first end forming an annular cutting edge;

means to press the vegetable into the tube at said first end to form a cylindrical core having a longitudinal axis;

means to rotate the core about the longitudinal axis; and cutting means movable into said tube for cutting said core when said core is rotated, whereby said predetermined shape is cut from the core.

2. Apparatus as claimed in claim 1 wherein said means to rotate said core enters said tube through said first end of said tube in order to engage said core to rotate said core.

3. Apparatus as claimed in claim 1 further comprising a support means for said core to support said core during rotation.

4. Apparatus as claimed in claim 2 further comprising a support means for said core to support said core during rotation.

5. Apparatus as claimed in claim 1 wherein said tube has a wall and at least one aperture in said wall, and said pressing means for pressing the core into said tube to register with said aperture, and said movable cutting means being movable laterally through said aperture for cutting said predetermined shape from said core when said core is rotated.

6. Apparatus as claimed in claim 3 wherein said tube has a wall and at least one aperture in said wall, and said pressing means for pressing the core into said tube to register with said aperture, and said movable cutting means being movable laterally through said aperture for cutting said predetermined shape from said core when said core is rotated.

7. Apparatus as claimed in claim 1 wherein said movable cutting means comprises a cutting tube having a sloping advance cutting edge.

8. Apparatus as claimed in claim 6 wherein said movable means comprises a cutting tube having a sloping advance cutting edge.

9. Apparatus as claimed in claim 7 wherein said support means comprises a slide plate carried by said movable cutting means and projecting forwardly form said movable cutting means, and wherein said tube has a slot in said tube wall adapted to permit entry of said slide plate into said tube to support said core during rotation.

10. Apparatus as claimed in claim 8 wherein said support means comprises a slide plate carried by said cutting tube and projecting forwardly from the sloping advance cutting edge, and wherein said tube has a slot in said tube wall adapted to permit entry of said slide plate into said tube to support said core during rotation.

11. Apparatus as claimed in claim 9 wherein said slide plate projecting forwardly form the advance cutting edge terminates in a cutting edge whereby when said sliding plate enters through said aperture, said cutting edge of said sliding plate severs a waste portion form said core.

12. Apparatus as claimed in claim 10 wherein said slide plate projecting forwardly form the movable cutting means terminates in a cutting edge whereby when said sliding plate enters through said aperture, said cutting edge of said sliding plate severs a waste portion from said core.

13. Apparatus as claimed in claims 1, 2, 3, 5, or 9 in which said pressing means includes said means to rotate said core.

14. Apparatus as claimed in claim 13 in which the means to press the vegetable into the tube and to rotate the core comprises a rotatable plunger, the end of the plunger carrying means embeddable into the core.

15. Apparatus as claimed in claim 7 wherein said tube has first and second apertures in said tube wall disposed opposite of each other, said movable cutting tube movable laterally and moving, in operation, through said first aperture and at least part of the advance sloping edge of said cutting tube passing out from inside said tube through said second aperture as said predetermined shape is cut from said core.

16. Apparatus as claimed in claim 15 further comprising a pressurized fluid supply and nozzle connected thereto, said nozzle for emitting fluid under pressure through said cutting tube, to remove waste form said cutting tube as said predetermined shape is being cut from said core and to remove said predetermined shape form inside said cutting tube through said second aperture after said predetermined shape has been cut from said core.

* * * * *